United States Patent
Yamada et al.

(10) Patent No.: US 7,845,729 B2
(45) Date of Patent: Dec. 7, 2010

(54) VEHICLE SEAT DEVICE

(75) Inventors: Yukifumi Yamada, Toyota (JP); Sadao Ito, Anjo (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/531,556

(22) PCT Filed: Jun. 26, 2008

(86) PCT No.: PCT/JP2008/061627

§ 371 (c)(1),
(2), (4) Date: Sep. 16, 2009

(87) PCT Pub. No.: WO2009/004972

PCT Pub. Date: Jan. 8, 2009

(65) Prior Publication Data

US 2010/0102605 A1    Apr. 29, 2010

(30) Foreign Application Priority Data

Jul. 5, 2007    (JP)    ............... 2007-177528

(51) Int. Cl.
*B60N 2/22*    (2006.01)
(52) U.S. Cl. .............. 297/284.1; 297/354.11; 297/396; 297/408; 297/410
(58) Field of Classification Search ................ 297/396, 297/410, 354.11, 284.1, 408
See application file for complete search history.

(56) References Cited

U.S. PATENT DOCUMENTS

| | | | |
|---|---|---|---|
| 4,165,899 A | * | 8/1979 | Goldner ............... 297/284.1 X |
| 4,626,028 A | * | 12/1986 | Hatsutta et al. ....... 297/284.1 X |
| 4,641,884 A | * | 2/1987 | Miyashita et al. ........ 297/284.1 |
| 4,693,515 A | * | 9/1987 | Russo et al. .......... 297/284.1 X |
| 4,934,755 A | * | 6/1990 | Berghoff ................. 297/284.1 |
| 5,058,953 A | * | 10/1991 | Takagi et al. .......... 297/284.1 X |
| 5,120,109 A | * | 6/1992 | Rangoni ................. 297/284.3 |
| 5,123,706 A | * | 6/1992 | Granzow et al. ..... 297/362.11 X |
| 5,370,443 A | * | 12/1994 | Maruyama ............... 297/284.1 |

(Continued)

FOREIGN PATENT DOCUMENTS

DE    4128160 A1 *    2/1993

(Continued)

*Primary Examiner*—Rodney B White
(74) *Attorney, Agent, or Firm*—Oblon, Spivak, McClelland, Maier & Neustadt, L.L.P.

(57) ABSTRACT

A vehicle seat device includes a seat cushion frame and a seatback frame including a lower-side frame supported at a lower end portion thereof to be tiltable relative to a rear end portion of the seat cushion frame, an upper-side frame arranged at an upper portion of the lower-side frame, and a center bending mechanism coupling the lower-side frame and the upper-side frame to be bendable forward, wherein the center bending mechanism bends the upper-side frame about a rotational center that is ahead of a seatback outer layer covering a front surface of the seatback frame. The movement of the upper-side frame when tilted comes close to the movement of the passenger who bends forward. The slip between the seatback outer layer and the back of the passenger can be minimized, and thus, it becomes possible to lessen an uncomfortable feeling of a passenger.

11 Claims, 7 Drawing Sheets

U.S. PATENT DOCUMENTS

| | | | | |
|---|---|---|---|---|
| 5,516,195 A | * | 5/1996 | Canteleux | 297/284.1 |
| 5,836,648 A | * | 11/1998 | Karschin et al. | 297/408 X |
| 6,019,424 A | * | 2/2000 | Ruckert et al. | 297/408 X |
| 6,082,823 A | * | 7/2000 | Aumont et al. | 297/284.1 X |
| 6,135,561 A | * | 10/2000 | Kruger et al. | 297/408 |
| 6,283,547 B1 | * | 9/2001 | Bauer et al. | 297/284.1 |
| 6,511,130 B2 | * | 1/2003 | Dinkel et al. | 297/410 |
| 6,550,856 B1 | * | 4/2003 | Ganser et al. | 297/284.1 X |
| 2004/0195895 A1 | * | 10/2004 | Sedlatschek et al. | 297/408 |
| 2005/0035642 A1 | * | 2/2005 | Hake et al. | 297/396 |

FOREIGN PATENT DOCUMENTS

| | | | |
|---|---|---|---|
| EP | 458000 A1 | * | 11/1991 |
| JP | 62 159764 | | 10/1987 |
| JP | 3 53147 | | 5/1991 |
| JP | 2005 82043 | | 3/2005 |
| JP | 2007 6948 | | 1/2007 |

* cited by examiner

VEHICLE SEAT DEVICE

TECHNOLOGICAL FIELD

The present invention relates to a vehicle seat device capable of independently tilting an upper section of a seatback which is divided in the vertical direction.

BACKGROUND ART

Heretofore, in vehicle seat devices, there is one which employs a seatback divided in the vertical direction and which employs a center bending mechanism in which an upper-side frame being a frame constituting an upper-side section thereof is tiltable independently of a lower-side frame being a frame constituting a lower-side section (Patent Document 1). The center bending mechanism in the vehicle seat device is a device which brings about a tilting motion at a hinge portion directly coupling an upper end portion of the lower-side frame and a lower end portion of the upper-side frame, and a rotational center in tilting the upper-side frame exists in the hinge portion.

Patent Document 1: JP2007-6948 A1 (refer to paragraph 0002, embodiment, FIG. 1 and the like)

DISCLOSURE OF THE INVENTION

Problem to be Solved by the Invention

However, a problem is found in that when the seatback is bent by the center bending mechanism in the prior art vehicle seat device, the passenger being seated on the vehicle seat device feels pressure and uncomfortableness by having his/her back pushed forward by the upper-side section of the seatback.

The present invention has been made taking the foregoing circumstance into consideration, and a problem to be solved is to provide a vehicle seat device in which a sense of discomfort such as pressure feeling and uncomfortable feeling is little when the upper section of a seatback which is divided in the vertical direction is tilted independently.

Measures for Solving the Problem:

As a result of diligent studies for the purpose of solving the foregoing problem, the present inventors have found that a slip which occurs between a seatback outer layer and the back of the passenger upon the bending of a seatback is a cause that gives the passenger an uncomfortable feeling.

That is, although the passenger bents the back about a rotational center close to the spinal column, the rotational center for the tilting motion of the upper-side section of the seatback when the seatback is tilted exists in the coupling section with the lower-side section of the seatback. Thus, even when the seatback outer layer is bent along the shape of the passenger's back, the moving amount of the seatback outer layer cannot follow the movement of the passenger's back, so that a large slip occurs to pull the clothing with an uncomfortable feeling.

In the present invention, with an object of lessening a slip between a seatback outer layer and the back of a passenger, the movement of an upper-side section of a seatback is made to come as close as possible to the back of the passenger. That is, by being positioned ahead of the seatback outer layer, the rotational center of a locus which the upper-side section draws when bent is made to come as close as possible to the rotational center about which the passenger bends.

The present invention has been completed based on the aforementioned knowledge, and the feature of a vehicle seat device in a first aspect for solving the foregoing problem resides in having a seat cushion frame; and a seatback frame having a lower-side frame supported at its lower end portion to be tiltable relative to a rear end portion of the seat cushion frame, an upper-side frame arranged at an upper portion of the lower-side frame, a center bending mechanism coupling the lower-side frame and the upper-side frame to be bendable forward, and drive means for driving the center bending mechanism;

wherein the center bending mechanism is configured to tilt the upper-side frame about a rotational center which is ahead of a seatback outer layer covering a front surface of the seatback frame.

Further, the feature of the vehicle seat device in a second aspect for solving the foregoing problem resides in that in the first aspect, the rotational center is located in the body of a passenger being seated.

Further, the feature of the vehicle seat device in a third aspect for solving the foregoing problem resides in that in the first or second aspects, the rotational center is located in the spinal column of the passenger being seated.

Still further, the feature of the vehicle seat device in a fourth aspect for solving the foregoing problem resides in that in any of the first to third aspects, the center bending mechanism is configured to tilt the upper-side frame while moving the same in a direction which extends from the upper end of the lower-side frame.

Further, the feature of the vehicle seat device in a fifth aspect for solving the foregoing problem resides in that in any of the first to fourth aspects, the center bending mechanism is a non-parallel four-link mechanism which includes the lower-side frame and the upper-side frame as opposite links.

Furthermore, the feature of the vehicle seat device in a sixth aspect for solving the foregoing problem resides in that in the fifth aspect, the non-parallel four-link mechanism of the center bending mechanism is arranged at each of both end portions in the width direction of the seatback frame; and that the drive means has link swing drive means for swinging one of other links than the lower-side frame and the upper-side frame of the non-parallel four-link mechanism arranged on one end side in the width direction of the seatback frame, relative to one frame of the lower-side frame and the upper-side frame being on the one end side; and a rotation transmission shaft for making a connection between either pivot point on the link swung by the link swig drive means and a corresponding pivot point on a link, corresponding to the link swung by the link swig drive means, in the other of the non-parallel four-link mechanisms and for synchronously rotating both of the links.

Further, the feature of the vehicle seat device in a seventh aspect for solving the foregoing problem resides in that in any of the first to fourth aspects, the center bending mechanism has a combination of a bracket section arranged on one of the lower-side frame and the upper-side frame and forming a guide portion taking the shape of an arc with a center at the rotational center and two or more slide sections arranged on the other of the lower-side frame and the upper-side frame and engaged with the guide portion of the bracket section to be movable in the circumferential direction of the arc but to be restricted from moving in the radial direction.

Further, the feature of the vehicle seat device in an eighth aspect for solving the foregoing problem resides in that in the seventh aspect, the combination of the bracket section and the slide sections in the center bending mechanism is arranged at each of both end portions in the width direction of the seatback frame; and that the drive means has a rotation transmission shaft rotatably arranged to extend between both end portions of one of the lower-side frame and the upper-side frame, slide mechanisms for changing the relative potions between the bracket sections and the slide sections by the use of the rotational motion of the rotation transmission shaft, and rotation drive means for rotating the rotation transmission shaft.

EFFECTS OF THE INVENTION:

In the invention in the first aspect, by locating ahead of the seatback outer layer the rotational center for the tilting motion of the upper-side frame in the seatback frame which has the lower-side frame, the upper-side frame arranged at the upper portion of the lower-side frame, and the center bending mechanism coupling the lower-side frame and the upper-side frame to be bendable forward, the motion of the upper-side frame when tilted comes close to the motion of the passenger who bends forward, and thus, it can be realized to lessen the slip occurring between the seatback outer layer and the back of the passenger, so that the uncomfortable feeling given to the passenger can be made to be little.

In the invention in the second aspect, by locating the rotational center for the tilting motion of the upper-side frame in the body of the passenger being seated, it becomes possible to realize the follow ability of the seatback outer layer to the back of the passenger in a higher level.

In the invention in the third aspect, by locating the rotational center for the tilting motion of the upper-side frame in the spinal column of the passenger in which the rotational center of the tilting operation when the passenger being seated bends forward is presumed to reside, it becomes possible to realize the follow ability of the seatback outer layer to the back of the passenger in a further higher level.

In the invention in the fourth aspect, by tilting the upper-side frame while moving the same in the direction which extends from the upper end of the lower-side frame, it becomes possible to lessen the slip between the back of the passenger and the seatback outer layer, so that the occurrence of the uncomfortable feeling can be made to be little.

In the invention in the fifth aspect, by employing as the center bending mechanism the non-parallel four-link mechanism which includes the lower-side frame and the upper-side frame as opposite links, it becomes possible to arrange the rotational center for the tilting motion at an arbitrary position ahead of the seatback outer layer. Further, by employing the link mechanism, it becomes possible to strengthen the coupling between the upper-side frame and the lower-side frame.

In the invention in the sixth aspect, in addition to arranging the non-parallel four-link mechanism of the center bending mechanism at each of both end portions in the width direction of the seatback frame, by having as the drive means the link swing drive means for swinging one of other links than the lower-side frame and the upper-side frame of the non-parallel four-link mechanism arranged on one end side in the width direction of the seatback frame, relative to one frame of the lower-side frame and the upper-side frame being on the one end side and the rotation transmission shaft making the connection between either pivot point on the link swung by the link swig drive means and the corresponding pivot point on the link, corresponding to the link swung by the link swig drive means, in the other of the non-parallel four-link mechanisms for synchronously rotating both of the links, it becomes possible to synchronize the movements of the non-parallel four-link mechanisms provided on the both sides in the width direction, and it also becomes possible to suppress the occurrence of ricketiness between the two non-parallel four-link mechanisms in the operation of the center bending mechanism. In particular, by selecting the pivot point being an axis for the links to swing as a portion which makes the links synchronized, the force to be transmitted between the both end portions becomes rotational motion only, so that the drive force inputted to the link at the one end portion of the both end portions can speedily be transmitted to the corresponding link at the other end portion. Further, since the link swing drive means swings the links coupled by the rotation transmission shaft, the drive force inputted to the link at the one end portion of the both end portions can speedily be transmitted to the corresponding link at the other end portion. In addition, by synchronizing the both of the non-parallel four-link mechanisms provided at both end portions in the width direction, it can be realized to reduce the number of the link swing drive means which tilts the upper-side frame.

In the invention in the seventh aspect, the restriction on the movement during the tilting motion of the upper-side frame can be decreased by employing the center bending mechanism which has the combination of the bracket section forming the guide portion taking the shape of the arc with the center at the rotational center and the two or more slide sections engaged with the guide portion of the bracket section to be movable in the circumferential direction of the arc but to be restricted in the radial direction. In short, by forming the guide portion which has the shape corresponding to the movement of the upper-side frame in the tiling motion, it becomes possible to make the locus of the upper-side frame in the titling motion appropriate.

In the invention in the eighth aspect, in addition to arranging the combination of the bracket section and the slide sections at each of the both end portions in the width direction of the seatback frame, by providing the drive means which makes the both members move synchronously, it becomes possible to suppress the occurrence of ricketiness in the width direction during the operation of the center bending mechanism. Further, by synchronizing the both of the combinations of the bracket sections and the slide sections which are provided at both end portions in the width direction, it becomes possible to decrease the number of the members which perform the tilting motion of the upper-side frame.

DESCRIPTION OF SYMBOLS

Figure 1:
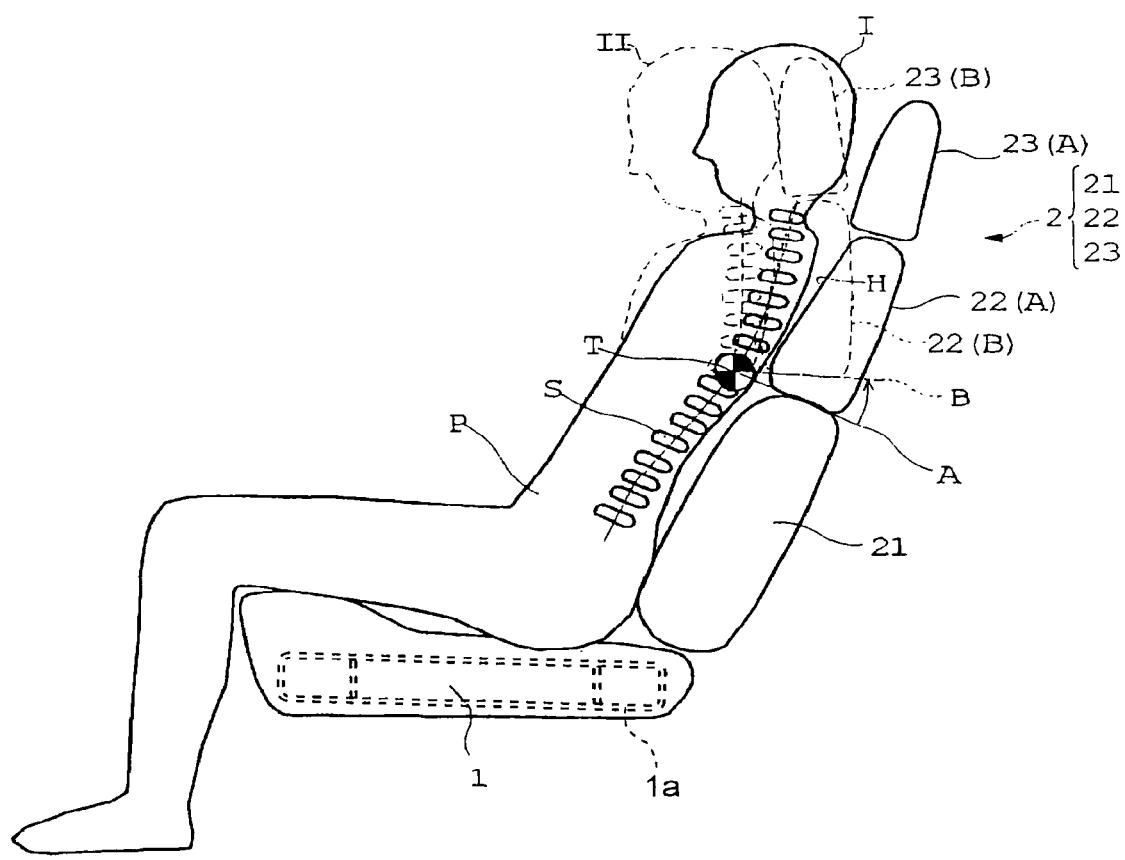
FIG. 1. is a schematic view showing the outline of the construction and operation of a vehicle seat device in the present embodiment.

1 ... seat cushion
2 ... seatback 21 ... lower-side seatback 22 ... upper-side seatback 23 ... headrest
3 ... lower-side frame 31, 32 ... lower-side frame body sections
4 ... upper-side frame 41, 42 ... upper-side frame body sections 43 ... pipe frame
5 ... center bending mechanism 51a, 51b, 52a 52b ... links
6 ... drive means 61 ... rotation transmission shaft 62 ... link swing drive means 621 ... motor 622 ... output conversion mechanism 623 ... output rod
7 ... center bending mechanism 71a, 71b, 72a, 72b ... guide groove portions 73a-76a, 73a-76b ... slide protrusions 79a and 79b ... bracket sections
8 ... drive means 81 ... rotation transmission shaft 82 ... motor 84 ... reduction gear mechanism 85a, 85b ... links 86a, 86b ... coupling links
T, TA, TB ... rotational center
A ... upright position B ... forward tilted position

PREFERRED EMBODIMENT FOR PRACTICING THE INVENTION

Hereafter, with reference to FIGS. 1-7, a vehicle seat device in an embodiment according to the present invention will be described in the form of a vehicle seat device which is equipped for a front seat of a motor car. It is to be noted that "forward-rearward, left-right (width) and upper-lower" directions used throughout the present specification will be described on the basis of those in vehicles.

As shown in FIG. 1, the vehicle seat device 1 in the present embodiment has a seat cushion 1 and a seatback 2. The seatback 2 is tiltably supported by a rear end portion of the seat cushion 1 at a lower end portion thereof. The seatback 2 has a lower-side seatback 21, an upper-side seatback 22, a headrest 23, a center bending mechanism (not shown) and drive means (not shown). The lower-side seatback 21 is tiltably supported by the rear end portion of the seat cushion 1 at the lower end portion thereof and couples the entirety of the seatback 2 to the seat cushion 1. The upper-side seatback 22 is tiltably supported by an upper end portion of the lower-side seatback 21 at a lower end portion thereof. The headrest 23 is supported at an upper end portion of the upper-side seatback 22 with the space therebetween being expansible. The center bending mechanism and the drive means are arranged between the lower-side seatback 21 and the upper-side seatback 22. The center bending mechanism is a mechanism for tilting the upper-side seatback 22 relative to the lower-side seatback 21, and the drive means is a means for driving the center bending mechanism to tilt the upper-side seatback 22 relative to the lower-side seatback 21.

Description will be made regarding the situation in which the upper-side seatback 22 is tilted relative to the lower-side seatback 21. The upper-side seatback 22 moves from a position A indicated by the solid line in FIG. 1 to a position B indicated by the broken line as it is tilted. At this time, a seatback outer layer H being at a front surface of the upper-side seatback 22 pushes the back of a passenger P, so that the upper half body of the passenger P is bent at the back to move from a position I indicated by the solid line to a position II indicated by the broken line.

In this case, the rotational center for the tilting motion of the upper-side seatback 22 is ahead of a seatback outer layer H and resides at a position T adjacent to a part where a spinal column section S of the passenger is bent. Therefore, when the back of the passenger P is bent by being pushed by the upper-side seatback 22, the seatback outer layer H at the front surface of the upper-side seatback 22 is moved to follow the movement of the back of the passenger P, so that it becomes possible to lessen a slip occurring between the back and the seatback outer layer H.

That is, because it is presumed that the surface of the back rotates about a rotational center at a position T which is ahead of the seatback outer layer H and which resides approximately in the spinal column section S, the upper-side seatback 22 is also made to be tilted about the rotational center at the position T which is a position in the spinal column section S of the passenger (adult). In other words, the rotational center at the position T is coaxial with an imaginary axis (not shown) which horizontally extends across the body of the passenger P being seated, in the left-right or width direction of the seatback 2. More specifically, the imaginary axis horizontally extends across the spinal column section or backbone S of the passenger P being seated, in the left-right direction of the seatback 2.

As long as the rotational center for the tilting motion of the upper-side seatback 22 is separated even slightly from the seatback outer layer, it is possible to reduce the uncomfortable feeling sufficiently. For example, the distance can be taken such as one being within 20 centimeters, 15 centimeters, 10 centimeters or the like ahead of the seatback outer layer. In particular, it is desirable to provide the rotational center close to the rotational center for the tiling operation which the passenger makes when bending forward. With respect to the position in the vertical direction, the rotational center is desirable to be provided close to the rotational center about which the passenger bends forward, such as, for example, at the breast or the boundary between the breast and the abdomen.

Hereinafter, there will be described various forms of the center bending mechanism which enables the rotational center for the tilting motion of the upper-side seatback 22 to be located ahead of the seatback outer layer H such as at the position T.

(First Form)

Figure 2:
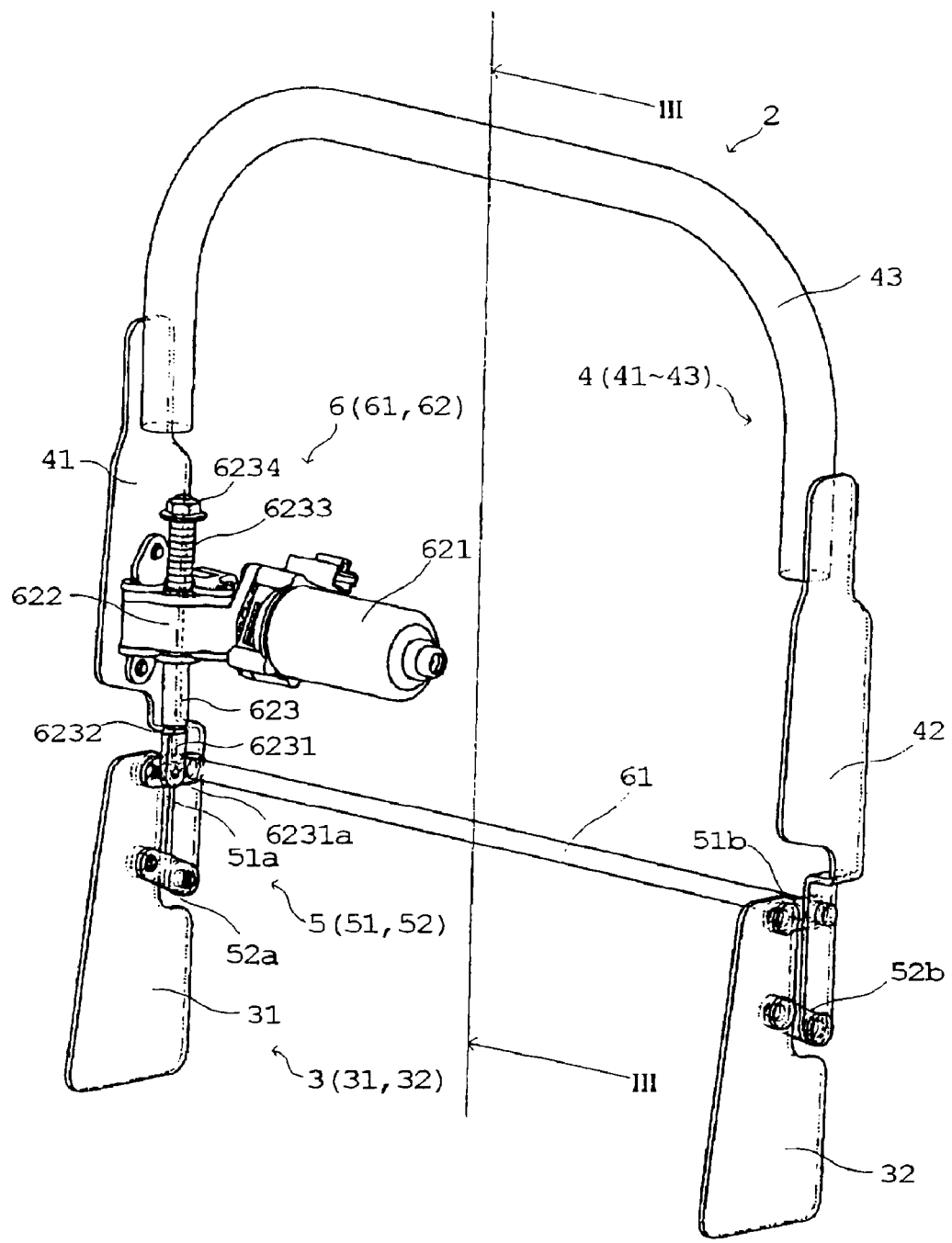
FIG. 2. is a perspective view showing the construction of respective members constituting a seatback of the vehicle seat device in a first form of the present embodiment.
Figure 3:
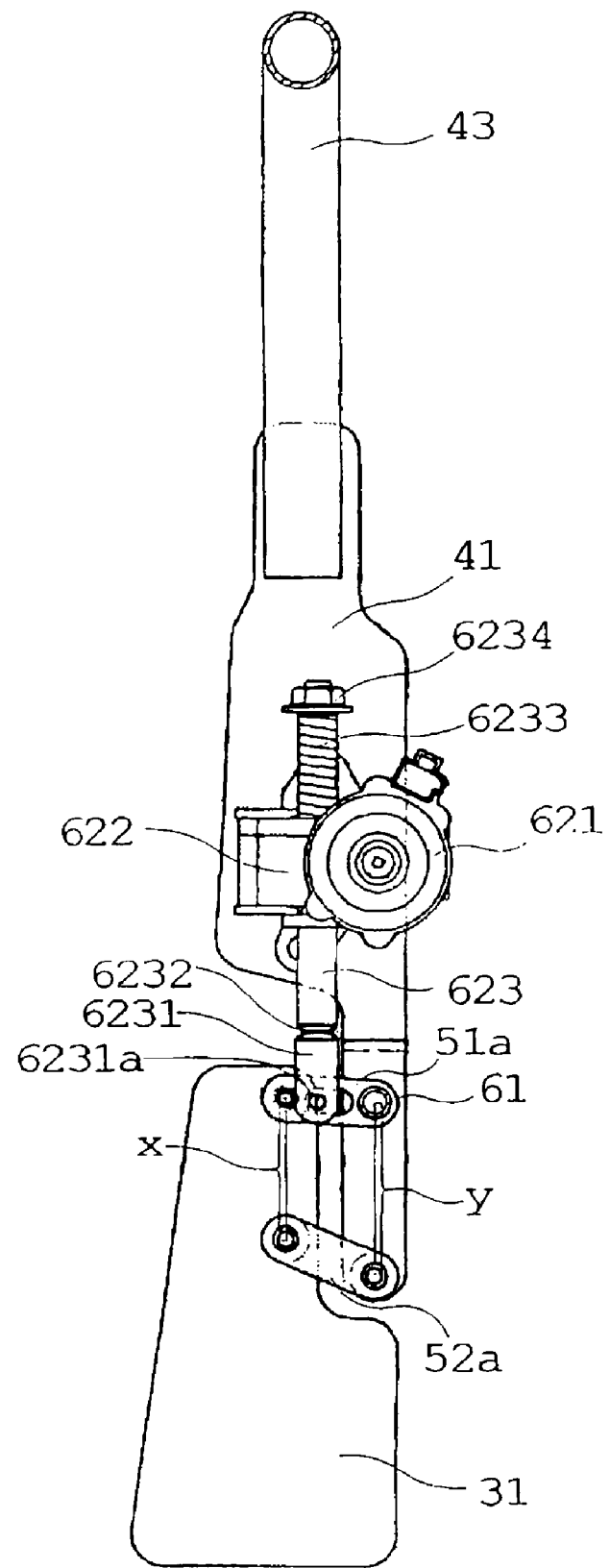
FIG. 3. is a sectional view taken along the line III-III in FIG. 2.

As shown in FIG. 2, the lower-side seatback 21 in the seatback 2 in the present form has the lower-side frame 3 arranged therein, while the upper-side seatback 22 has the upper-side frame 4 arranged therein. The center bending mechanism 5 being a mechanism for tilting the upper-side frame 4 relative to the lower-side frame 3 is arranged between the lower-side frame 3 and the upper-side frame 4. The center bending mechanism 5 is driven by the drive means 6 and tilts the upper-side frame 4 relative to the lower-side frame 3.

The lower-side frame 3 is composed of lower-side frame body sections 31 and 32 being plate-like members which are respectively provided at both end portions in the width direction of the lower-side seatback 21 to face each other. Although the details are omitted, the lower-side frame body sections 31 and 32 are fixed at lower end portions thereof to a reclining mechanism (not shown) which is tiltably supported at a rear end portion of a seat cushion frame 1a arranged in the seat cushion 1.

The upper-side frame 4 has upper-side frame body sections 41 and 42 being plate-like members which are respectively provided at both end portions in the width direction of the upper-side seatback 22 to face each other, and a pipe frame 43 which is arranged to extend over upper-end portions of the upper-side frame body sections 41 and 42 and to couple the both members. Although the details are omitted, a headrest holding mechanism (not shown) capable of expansively holding the headrest 23 is arranged over the pipe frame 43.

The center bending mechanism 5 has two pairs of links 51a, 52a and links 51b, 52b which respectively form non-parallel four links by respectively making the connection between the lower-side frame body section 31 and the upper-side frame body section 41 and the connection between the lower-side frame body section 32 and the upper-side frame body section 42. In the state that the upper-side frame 4 is not tilted, the links 51a and 52a generally extend in the forward-rearward direction, and front end portions thereof are rotatably supported on the lower-side frame body section 31, while rear end portions thereof are rotatably supported on the upper-side frame body section 41. Like the links 51a and 52a, the links 51b and 52b are also arranged to generally extend in the forward-rearward direction, and front end portions thereof are swingably supported on the lower-side frame body section 32, while rear end portions thereof are swingably supported on the upper-side frame body section 42.

That is, the upper end portions of the lower-side frame body sections 31 and 32 are arranged to be located ahead of the respective lower end portions of the upper-side frame body sections 41 and 42. Here, the links 51a and 51b have the same length, and the links 52a and 52b also have the same length. The links 52a and 52b are somewhat longer than the links 51a and 51b. Further, the distance at which the links 51a and 52a are supported on the lower-side frame body section 31 is made to be shorter than the distance at which the links 51a and 52a are supported on the upper-side frame body section 41. Therefore, the counterclockwise rotation of the links 51a and 52a in FIG. 3 causes the upper-side frame body section 41 to tilt counterclockwise.

Figure 4:
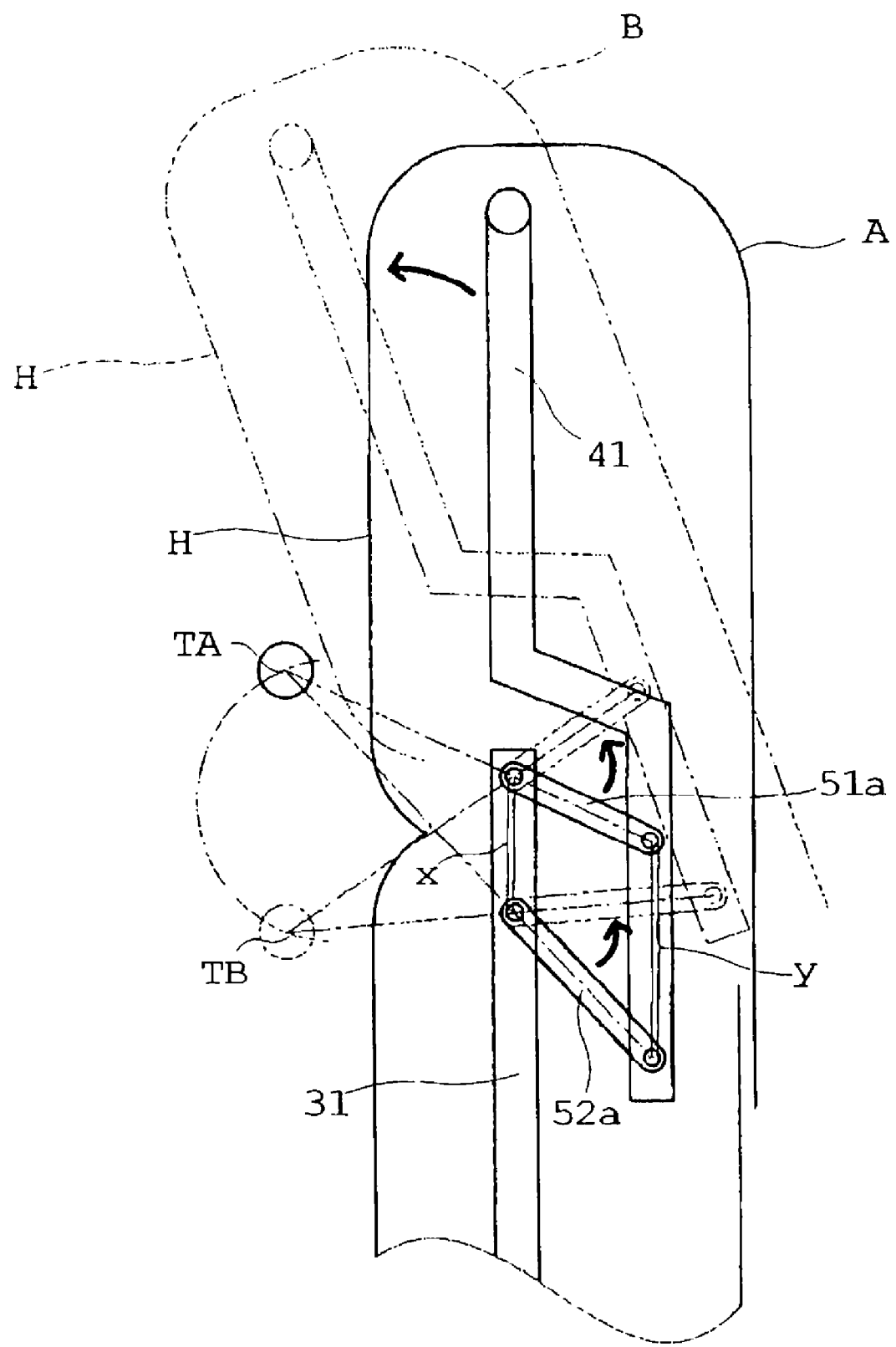
FIG. 4. is a schematic view for explaining the operation of the seatback of the vehicle seat device in the first form of the present embodiment.

This operation will hereafter be described schematically with reference to FIG. 4. First of all, in the case (A) that the upper-side frame body section 41 remains in parallel to the lower-side frame body section 31 without being tilted, the inclination of the link 52a is larger than that of the link 51a. This is due to the fact that the distance x at which the front end portions of the links 51a and 52a are supported on the lower-side frame body section 31 is shorter than the distance y at which the rear end portions are supported on the upper-side frame body section 41 and that the length of the link 51a is made to be shorter than that of the link 52a.

As the link 51a is then swung counterclockwise (in the direction of the arrow), the link 52a is also swung counter-clockwise (in the direction of the arrow) with the result that the inclination of the link 51a and the inclination of the link 52a come close to each other gradually. Thus, the relative relationship between the lower-side frame body section 31 and the upper-side frame body section 41 becomes such that the lower span coupled by the link 52a becomes relatively longer with the result that the upper-side frame body section 41 is gradually tilted counterclockwise (in the direction of the arrow) to reach the position B. In this case, the rotational center for the tilting motion of the upper-side frame 41 resides at an intersection where respective extension lines of the links 51a and 52 are crossed, and gradually moves from a position TA where it was first, to a position TB with the swing motions of the links 51a and 52a.

As is clear from the figure, the position TA and the position TB not only reside ahead of the lower-side frame body section 31, but also reside ahead of the seatback outer layer H. The position of the rotational center can be made to come close to the lower-side frame body section 31 by relatively shortening the distance x at which the front end portions of the links 51a and 52b are supported on the lower-side frame body section 31, relative to the distance y at which the rear end portions are supported on the upper-side frame body section 41. Further, by relatively shortening the length of the link 51a relative to that of the link 52a, the distance through which the rotational center for the tilting motion of the upper-side frame body section 41 moves can be made to be relatively long with respect to the angle through which the link 51a is swung.

The drive means 6 has a rotation transmission shaft 61 being a tubular member which bodily couples the links 51a and 51b at the pivot points of the same to synchronously rotate the both links, and link swing drive means 62 for swinging the link 51a. The link swing drive means 62 is secured to the upper-side frame body section 41 and has a motor 621, an output conversion mechanism 622 for converting the rotational output from the motor 621 into a vertical linear motion to output the linear motion, and an output rod 623 supported at its one end portion to be swingable in an elongate hole formed in the link 51a and coupled to the output of the output conversion mechanism 622 to be linearly movable bidirectionally in the axial direction. The link swing drive means 62 swings the link 51a about a pivot point provided on the upper-side frame body section 41.

The motor 621 is bodily provided at its output shaft with a reduction gear mechanism (not shown) which outputs the rotational output of the output shaft at a reduced speed and is arranged on the upper-side frame body section 41 side with the output shaft oriented in the width direction. Then, the output of the reduction gear mechanism is inputted to the output conversion mechanism 622. The motor 621 is drivingly controllable by a motor drive unit not shown. The motor drive unit is operable by a manipulation switch manipulatable by the passenger to drive the motor 621 in either of the positive and negative-going directions.

The output conversion mechanism 622 is secured to the upper-side frame body section 41. The output conversion mechanism 622 has a worm (no shown) with its rotational axis extending in the width direction in which the output from the reduction gear mechanism is connected, and a worm wheel (not shown) with its rotational axis extending in the vertical direction orthogonal to the rotational axis of the worm. The worm and the worm wheel are rotatably housed in a housing of the output conversion mechanism 622. The output rod 623 has a coupling section 6231 swingably coupled with the link 51a, a screw shaft 6233 being a rod-like member which extends above the coupling section 6231 from the coupling section 6231 through a joint section 6232 and which has a screw formed at a circumferential surface thereof, and a movement limiting nut 6234 secured to the upper end portion of the screw shaft 6233.

The screw shaft 6233 is supported by the link 51a through the coupling section 6231 and is restricted from rotating about its axis. A screw meshing with the screw shaft 6233 is formed at an internal surface of the worm wheel, and the screw engagement is made at around the center part of the screw shaft 6233. Therefore, since the screw shaft 6233 of the output rod 623 cannot rotate, the rotation of the worm wheel causes the screw shaft 6233 to move in the axial direction by the action of the screw meshing therewith. The downward movement of the output rod 623 is limited by the movement limiting nut 6234, while the upward movement is limited by the length of the screw formed on the screw shaft 6233. By controlling the distance of the movement, it becomes possible to regulate the latter-mentioned moving range of the link 51a, and hence, it becomes possible to arbitrarily set the tilting motion range of the upper-side seatback 22.

The coupling section 6231 is coupled to the link 51a by a protrusion portion 6231a which is provided at a lower end portion thereof and which is inserted into the elongate hole provided in the link 51a to extend in the forward-rearward direction. Thus, the forward-rearward displacement caused by the swing motion of the link 51a is absorbed by the elongate hole, and the movement in the vertical direction of the output rod 623 is converted into the swing motion of the link 51a. When the output rod 623 extends downward, the link 51a is swung counterclockwise as viewed in FIG. 3. Thus, by the action of the aforementioned two pairs of link mechanisms composed of the links 51a, 52a, 51b and 52b, the upper-side frame 4 is tilted forward as it is moved upward.

In the summary of the aforementioned description, when the passenger manipulates the manipulation switch in order to tilt the upper-side seatback 22 of the seatback forward, the motor drive unit causes the motor 621 to rotate in a predetermined direction. Then, the output of the motor 621 causes the worm of the output conversion mechanism 622 to be rotated through the reduction gear mechanism, whereby the worm wheel meshing therewith is rotated in a predetermined direction by the rotation of the worm. Because of being restricted from rotation about its axis, the screw shaft 6233 being in screw-engagement with the worm wheel is moved by the screw action in the axial direction (downward direction), and the output shaft 623 is moved downward to move the link 51a downward through the coupling section 6231. Thus, the link 51a is swung about an axis at the rear end portion supported by the upper-side frame body section 41 (counterclockwise in FIG. 3). By the downward swing motion of the link 51a, the upper-side frame body section 41 is tilted forward by the action of the non-parallel four-link mechanism which is formed by the links 51a and 52a, the lower-side frame body section 31 and the upper-side frame body section 41. The rotational center of the upper-side frame body section 41 in this case is located ahead of the lower-side frame body section 31 (further, ahead of the seatback outer layer H). Here, since the rotation transmission shaft 61 causes the link 51b to be swung in synchronized relation with the link 51a, the link 51b is likewise swung to follow the swing motion of the link 51a, whereby the upper-side frame body section 42 being connected is also swung forward to draw the same locus of the upper-side frame body section 41.

On the contrary, in order to make the upper-side seatback 22 go back from the tilt for removal of the forward tilt relative to the lower-side seatback 21, the passenger manipulates the manipulation switch to rotate the motor 621 reversely, whereby the operations take place in an order reverse to the foregoing operations to tile the upper-side seatback 22 rearward.

(Second Form)

Hereinafter, description will be made regarding a second form of the center bending mechanism and the drive means which forward tilt the upper-side seatback 22 of the seatback 2 in the vehicle seat device of the present invention. In the vehicle seat device of the present form, the same reference numerals are given to some of the members which perform similar functions to those of the vehicle seat device described in the first form.

Figure 5:
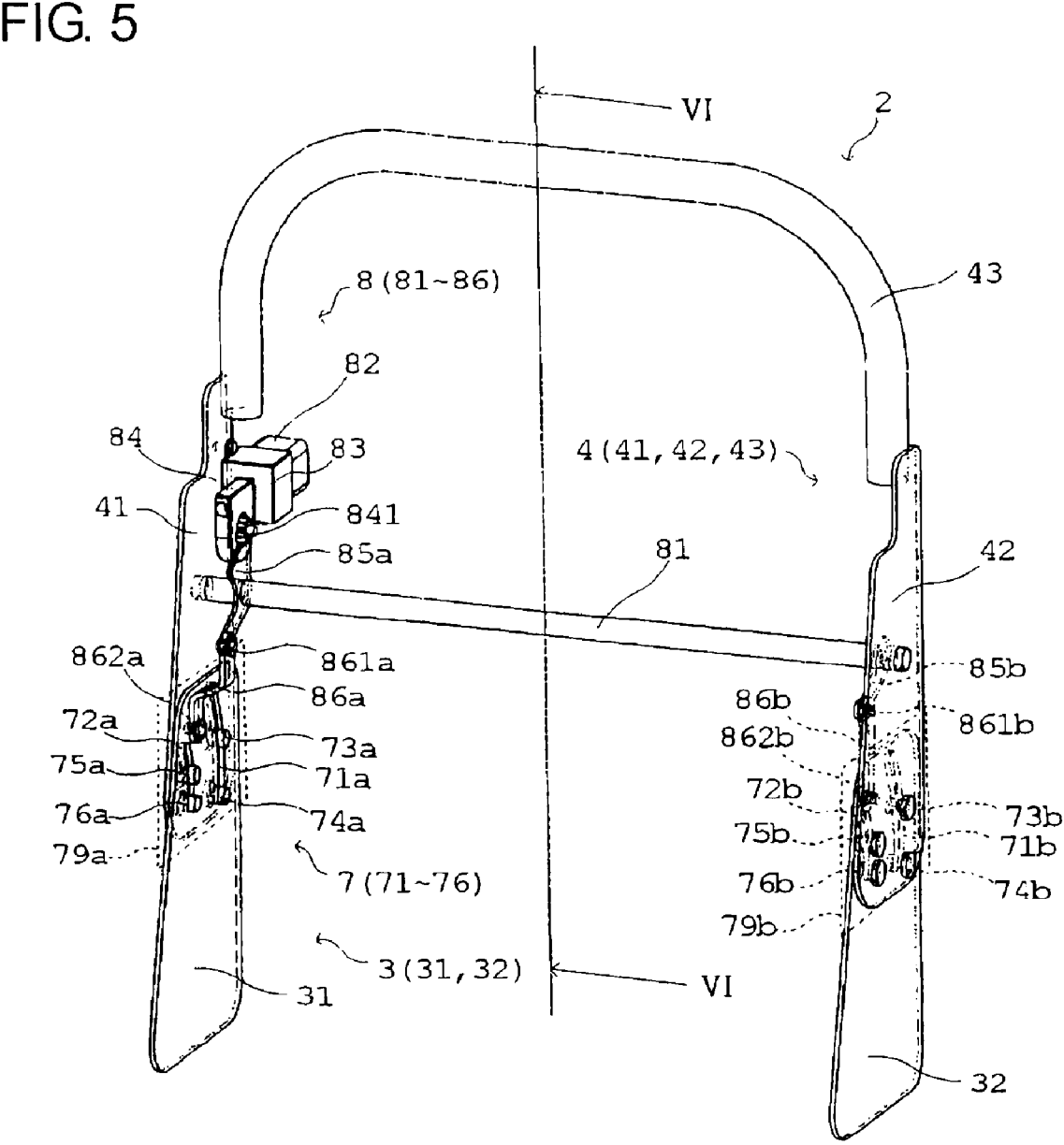
FIG. 5. is a perspective view showing the construction of respective members constituting a seatback of the vehicle seat device in a second form of the present embodiment.
Figure 6:
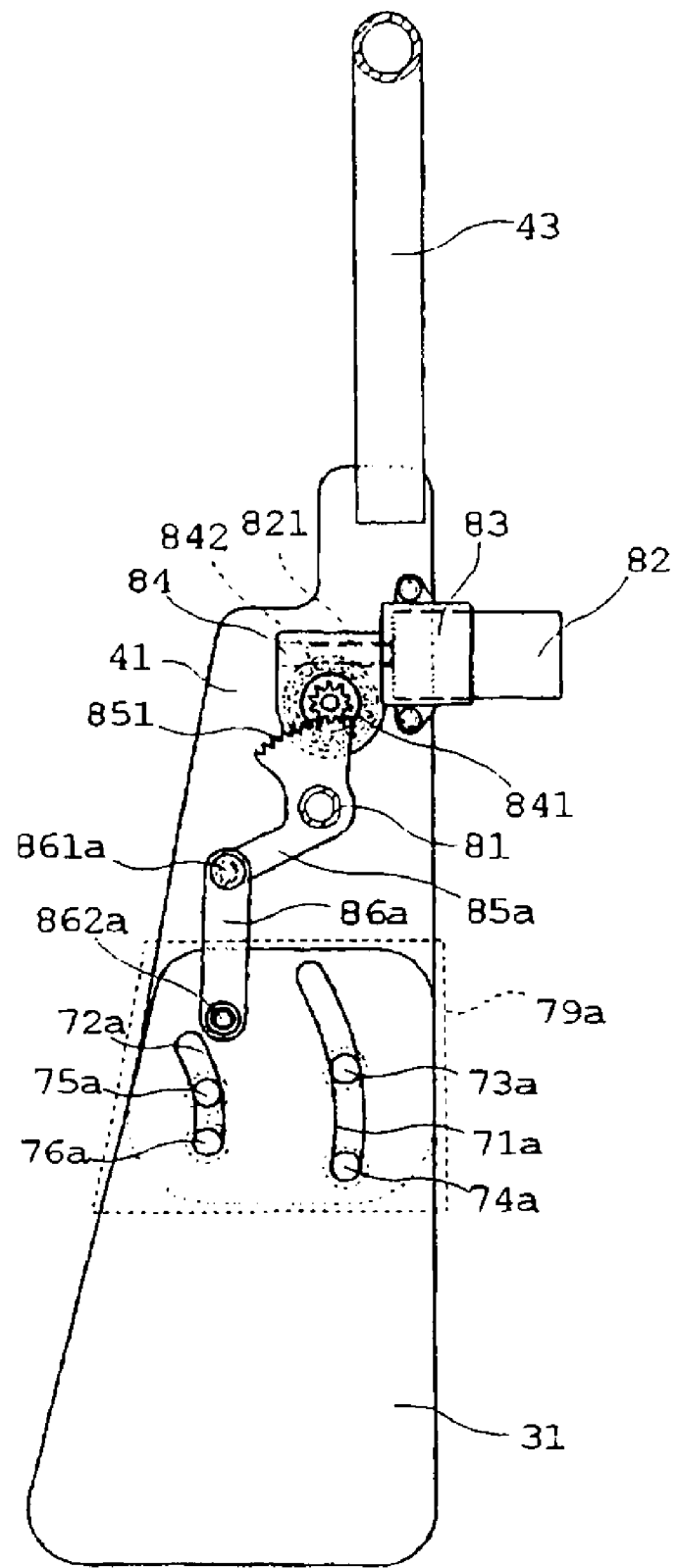
FIG. 6. is a sectional view taken along the line VI-VI in FIG. 5.

As shown in FIGS. 5 and 6, a lower-side frame 3 is arranged within a lower-side seatback 21 of a seatback 2 in the present form, while an upper-side frame 4 is arranged in an upper-side seatback 22. The upper portion of the lower-side frame 3 and the lower portion of the upper-side frame 4 partly overlap, with the upper-side frame 4 covering from both sides, and a center bending mechanism 7 being a mechanism for tilting the upper-side frame 4 relative to the lower-side frame 3 is arranged between the overlapping portions of the lower-side frame 3 and the upper-side frame 4. The center bending mechanism 7 is driven by drive means 8 and tilts the upper-side frame 4 relative to the lower-side frame 3.

Since the lower-side frame 3 and the upper-side frame 4 are members which take almost the same forms as those in the first form, further description thereof will be omitted.

The center bending mechanism 7 has guide groove portions 71a, 72a, 71b and 72b guide portions which are formed by cutting out groove shapes in bracket sections 79a, 79b fixedly positioned at upper portions of the lower-side frame body sections 31 and 32, and slide protrusions 73a-76a and 73b-76b as slide sections being protrusions which are inserted and arranged in the guide groove portions 71a, 72a, 71b and 72b, are slidable inside the same in the groove-forming direction and are fixedly protruded at the lower portions of the upper-side frame body sections 41 and 42 to extend inward.

The shapes of the guide groove portions 71a, 72a, 71b and 72b make a locus along which the rotational center for the tilting motion of the upper-side seatback 22 becomes ahead of the seatback outer layer H, and the slide protrusions 73a-76a and 73b-76b are arranged in the guide groove portions 71a, 72a, 71b and 72b. Thus, the slide protrusions 73a-76a and 73b-76b are caused to slide along the shapes of the grooves, so that the upper-side seatback 22 is tilted along the shapes of the guide groove portions 71a, 72a, 71b and 72b.

Because the guide groove portions 71a, 72a and the guide groove portions 71b, 72b are formed to have the same shapes in the bracket sections 79a and 79b which are arranged at corresponding positions on the lower-side frame body sections 31 and 32, the description which will be made in detail regarding the shapes of the guide groove portions 71a and 72a are applied, as it is, to the shapes of the guide groove portions 71b and 72b. Likewise, since the slide protrusions 73a-76a and the slide protrusions 73b-76b are formed to take the same shapes at corresponding positions on the upper-side frame body sections 41 and 42, the description which will be made in detail regarding the shapes of the slide protrusions 73a-76a is applied, as it is, to the shapes of the slide protrusions 73b-76b.

The guide groove portion 71a and the guide groove portion 72a are formed as arc-shaped grooves convex rearward respectively at a rear part on the bracket section 79a, which is at the upper portion of the lower-side frame body section 31, and at a front part of the guide groove portion 71a. The guide groove portions 71a and 72a have a common center though the guide groove portion 72a located on the front side is larger in curvature. The center becomes the rotational center for the upper-side seatback 22 to tilt, and the angles of the arcs made by these guide groove portions 71a and 72a and the angles at which the slide protrusions 73a-76a are arranged influence the angular range over which the upper-side seatback 22 can tilt independently.

Since two members including the slide protrusion 73a and the slide protrusion 74a are arranged at an upper part and a lower part in the guide groove portion 71a which is formed as a continued arc-shaped groove, the relative rotation about one of the slide protrusions 73a and 74a can be restricted. Therefore, the relative movement between the lower-side frame body section 31 with the guide groove portion 71a and the upper-side frame body section 41 with the slide protrusions 73a and 74a depends only on the shape of the guide groove portion 71a. Likewise, since the slide protrusion 75a and the slide protrusion 76a are arranged at an upper part and a lower part in the guide groove portion 72a, the relative rotation about one of the slide protrusions 75a and 76a is also restricted. By forming the two guide groove portions 71a and 72a and by arranging the four slide protrusions 73a to 76a in total including two for each groove portion, it becomes possible to lessen the ricketiness which would otherwise occur at the connection between the lower-side upper frame body section 31 and the upper-side body section 41. That is, although two are sufficient in the number of the slide protrusions, it is desirable that the number be 3 or more and in particular, be four or more.

An extension line extending across the arrangement positions of the slide protrusion 73a and the slide protrusion 75a passes across the center of the arcs formed by the aforementioned guide groove portions 71a and 72a, and an extension line extending across the arrangement positions of the slide protrusions 73a and the slide protrusion 75a also passes across the center. Thus, the range in which the slide protrusions 73a-76a are slidable within the guide groove portions 71a and 72a is a range covering the position where the slide protrusion 73a reaches the upper end portion of the arc formed by the guide groove portion 71a and the position where the slide protrusion 74a reaches the lower end portion of the arc. Specifically, the range in which the slide protrusions 73a-76a are slidable within the guide groove portions 71a and 72a becomes a range which is made by subtracting the angle at which the slide protrusions 73a and 74a are arranged, from the angle of the arc formed by the guide groove portion 71a.

Figure 7:
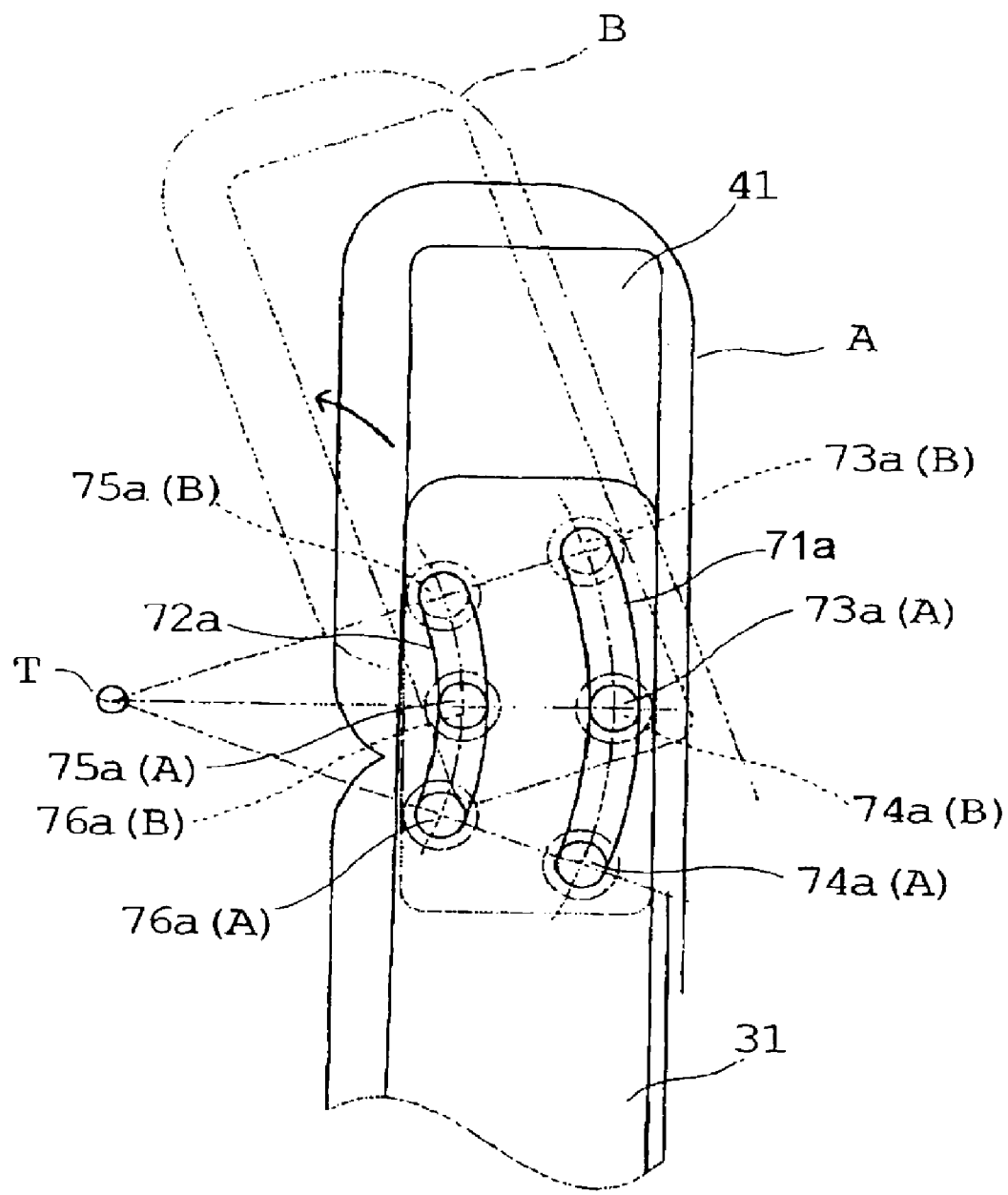
FIG. 7. is a schematic view for explaining the operation of the seatback of the vehicle seat device in the second form of the present embodiment.

This operation will be schematically described with reference to FIG. 7. First of all, in the state (A) that the upper-side frame body section 41 remains arranged in parallel to the lower-side frame body section 31 without being tilted, the slide protrusions 74a and 76b are positioned at respective lower end portions of the guide groove portions 71a and 72a.

As the slide protrusions 73a-76a are slidden in the guide groove portions 71a and 72a in the circumferential direction of the same, the upper-side frame body section 41 is tilted gradually. The tilting motion of the upper-side frame body section 41 can be carried out until the slide protrusions 73a and 75a come into contact with the respective upper end portions of the guide groove portions 71a and 72a.

Since the upper-side frame body section 41 moves along the shapes of the guide groove portions 71a and 72a, it is tilted about a position T being the center of the arcs formed by the guide groove portions 71a and 72a. The position T is ahead of the seatback outer layer H and, in the present form, always remains at the same position. In other words, the position T is coaxial with the aforementioned imaginary axis which horizontally extends across the body of the passenger P being seated, in the left-right direction of the seatback 2. More specifically, the imaginary axis horizontally extends across the spinal column section or backbone S of the passenger P being seated, in the left-right direction of the seatback 2. It is possible to freely set the position of the rotational center about which the upper-side frame section 41 is tilted, and it is also possible to make a setting so that the position is changed freely during the tilting motion.

The drive means 8 has a motor 82, a housing 83, a reduction gear mechanism 84, links 85a and 85b, coupling links 86a and 86b, and a rotation transmission shaft 81. The motor 82 is drivable and controllable by a motor drive unit not shown. The motor drive unit is controllable by a manipulation switch manipulatable by the passenger to drive the motor 82 in either of positive and negative-going directions.

The housing 83 is secured to an upper portion of the upper-side frame body section 41. The motor 82 and the reduction gear mechanism 84 are arranged in the housing 83. The motor 82 is fitted in the housing 83 in such a form that an output shaft 821 is inserted into the housing 83 to be oriented in the forward-rearward direction. The reduction gear mechanism 84 has a worm (not shown) secured to the output shaft 821 of the motor 82 and arranged in the housing 83 with its rotational axis oriented in the forward-rearward direction, a worm wheel 842 arranged in the housing 83 with its rotational axis oriented in the width direction and meshing with the worm, and a gear 841 secured to the axis of the worm wheel 842.

The link 85a takes a V-letter shape bent forward and is swingably supported by the upper-side frame body section 41 at a bent portion thereof. The link 85a forms a sector gear 851 meshing with the gear 841 at its upper end portion and is swingably coupled at its lower end portion with one end portion 861a of the coupling link 86a. The coupling link 86a is swingably supported by the bracket section 79a at its other end portion 862a.

A similar link mechanism is formed also on the upper-side frame body section 42 side. Specifically, the link 85b is swingably supported so that a support shaft therefor is arranged at a portion on the upper-side frame body section 42 which portion corresponds to that of a support shaft supporting the link 85a on the upper-side frame body section 41. The angle which the lower portion of the link 85b makes is the same the angle which the lower portion of the link 85a does. Unlike the link 85a, no sector gear is formed at the upper end portion of the link 85b. The links 85a and 85b are supported by the supported shafts to be synchronized by the rotation transmission shaft 81, and the link 85b is swung synchronously with the swing motion of the link 85a. The link 85b is swingably coupled at its lower end portion to one end portion 86b of the coupling link 86b. The coupling link 86b is swingably supported by the bracket portion 79b at its other end portion 862b.

Therefore, when the link 85a is swung, the lower-side frame body sections 31 and 32 are moved through the bracket sections 79a and 79b to change the distance relative to the upper-side frame body sections 41 and 42. That is, by the rotation of the motor 82, the worm is rotated through the output shaft 821 to rotate the worm wheel 842. The rotation of the worm wheel 842 is transmitted to the gear 841 and is converted by the sector gear 851 into the swing motion of the link 85a. The counterclockwise rotation of the gear 841 causes the link 85a to swing clockwise. Thus, since the one end portion 861a is drawn upward, the coupling link 86a is also moved upward to lifts up the bracket section 79a through the other end portion 862a. As a result, the distance between the lower-side frame body section 31 and the upper-side frame body section 41 is made to be narrow. The lower-side frame body section 31 and the upper-side frame body section 41 are moved as the slide protrusions 73a-76a are slidden in the guide groove portions 71a and 72a. When the gear 841 is rotated clockwise, on the contrary, the link 85a is swung counterclockwise, and thus, the distance between the lower-side frame body section 31 and the upper-side frame body section 41 is widened reversely.

The swing motion of the link 85a is transmitted through the rotation transmission shaft 81 also to the link 85b. The relative arrangement between the link 85b, the coupling link 86b and the bracket 79b is generally the same as that between the link 85a, the coupling link 86a and the bracket section 79a except that the left and right sides become reverse. Thus, the swing motion of the link 85b causes the bracket section 79b to be moved in the vertical direction, and the distance between the lower-side frame body section 32 and the upper-side frame body section 42 is made to be wide and narrow selectively like that between the distance between the lower-side frame body section 31 and the upper-side frame body section 41.

The foregoing description will be briefly summarized as follows. First of all, in order to move the upper-side seatback 22 of the seatback from the upright potion (A) to the forward tilted position (B) where the upper-side seatback 22 is tilted forward, the passenger manipulates the manipulation switch, and the motor drive unit rotates the motor 82 in a predetermined direction. Then, the output of the motor 82 is inputted to the reduction gear mechanism 84 through the output shaft 821 and is outputted from the gear 841. Since the gear 841 rotates clockwise, the link 85a is swung counterclockwise through the sector gear 851. As a result, the coupling link 86a is moved downward to widen the distance between the lower-side frame body section 31 and the upper-side frame body section 41. Since the relative position between the lower-side frame body section 31 and the upper-side frame body section 41 is regulated by the shapes of the guide groove portions 71a and 72a, the upper-side frame body section 41 is tilted forward with the rotational center at the position T and reaches the forward tilted position (B).

Next, in order to move the upper-side seatback 22 of the seatback from the forward tilted position (B) to the upright potion (A), the passenger manipulates the manipulation switch, and the motor drive unit is operated to rotate the motor 82 in a direction opposite to the predetermined direction. Thus, since the gear 841 rotates counterclockwise, the link 85a is swung clockwise through the sector gear 851. As a result, the coupling link 86a is moved upward to make narrow the distance between the lower-side frame body section 31 and the upper-side frame body section 41. The upper-side frame body section 41 is tilted rearward with the rotational center at the position T and reaches the upright position (A).

(Modified Forms)

In the aforementioned second form of the vehicle seat device, the bracket sections 79a, 79b are fixedly positioned at the upper portions of the lower-side frame body sections 31 and 32 while the slide protrusions 73a-76a and 73b-76b are fixedly protruded from at the lower portions of the upper-side frame body sections 41 and 42. In a modified form, the arrangements may be reversed, in which the bracket sections 79a, 79b may be fixed on the lower portions of the upper-side frame body sections 41 and 42 while the slide protrusions 73a-76a and 73b-76b may be protruded from the upper portions of the lower-side frame body sections 31 and 32. In this modified form, the other or lower ends portions 862a, 862b of the coupling links 86a, 86b may be pivotably connected to the upper portions of the lower-side frame body sections 31, 32, respectively.

In stead of employing a guide groove portion being a groove-form cutout as used in the second form, the guide portion can be employed in the form of a guide rod which is rod-like member bent to a shape of the locus along which the upper-side seatback 22 is tilted and which is arranged at the same position as the guide groove portion.

The shape of the guide rod is properly controlled so that the rotational center for the forward tilting motion of the upper-side seatback 22 comes ahead of the seatback outer layer H. By bending the guide rod to take the same shape of the guide groove portion, it can be done to tilt the upper-side seatback 22 forward along the same locus as that in the second form.

As the slide sections, there can be employed members which are protruded toward the guide rod, are rotatable about rotational axes extending in the protruding direction and have at end portions a shape capable of gripping the guide rod with close fit on the same. These slide sections are arranged at the same positions as the respective slide protrusions in the second form.

When the upper-side seatback 22 is tilted forward, the end portions of the respective slide sections are kept to grip the guide rod, so that the relative position between the upper-side frame body section 41 and the lower-side frame body section 31 changes to follow the shape of the guide rod. The slide sections are always closely fitted on the guide rod at the rotatable end portions without deviating from the guide rod. That is, the upper-side seatback 22 is tilted forward along the shape of the guide rod.

(Modified Form 2)

The drive means 8 employed in the vehicle seat device of the second form can be employed in substitution for the drive means 6 in the vehicle seat device of the first form. On the contrary, the drive means 6 employed in the vehicle seat device of the first form can be employed in substitution for the device means 8 in the vehicle seat device of the second form.

Both of the drive means 6 and 8 are mechanisms which convert the rotational motion of the motor into the vertical movement (the up-down motion of the output rod 623 in the drive means 6 or the up-down motion of the coupling links 86a and 86b in the drive means 8) and are replaceable with each other.

INDUSTRIAL APPLICABILITY

Applicable is the use in a seatback frame which has a lower-side frame, an upper-side frame arranged at an upper portion of the lower-side frame, and a center bending mechanism coupling the lower-side frame and the upper-side frame to be bendable forward, and the rotational center for the tilting motion of the upper-side frame is positioned ahead of a seatback outer layer, so that the movement of the upper-side frame when the same is tilted comes close to the movement of the passenger who bends forward. The slip between the seatback outer layer and the back of the passenger can be minimized, and thus, it becomes possible to lessen an uncomfortable feeling given to the passenger.

The invention claimed is:

1. A vehicle seat device comprising:
   a seat cushion frame; and
   a seatback frame including a lower-side frame supported at a lower end portion thereof to be tiltable relative to a rear end portion of the seat cushion frame, an upper-side frame arranged at an upper portion of the lower-side frame, a center bending mechanism coupling the lower-side frame and the upper-side frame to be bendable forward, and drive means for driving the center bending mechanism;
   wherein the center bending mechanism is configured to tilt the upper-side frame about a rotational center that is ahead of, and spaced apart from, a seatback outer layer covering a front surface of the seatback frame, the rotational center of the upper-side frame being determined by the center bending mechanism.

2. The vehicle seat device according to claim 1, wherein the center bending mechanism is configured to tilt the upper-side frame while moving the same in a direction extending from an upper end of the lower-side frame.

3. The vehicle seat device according to claim 1, wherein the center bending mechanism is a non-parallel four-link mechanism including the lower-side frame and the upper-side frame as opposite links.

4. The vehicle seat device according to claim 3, wherein:
   the non-parallel four-link mechanism of the center bending mechanism is arranged at each of both end portions in a width direction of the seatback frame; and
   the drive means includes link swing drive means for swinging one link of the links of the four-link mechanism, other than the lower-side frame and the upper-side frame, in the non-parallel four-link mechanism arranged on one end side in the width direction of the seatback frame, relative to one frame of the lower-side frame and the upper-side frame on the one end side, and further comprising a rotation transmission shaft connecting either one of pivot points on the link swung by the link swing drive means with a corresponding pivot point on a link, corresponding to the link swung by the link swing drive means, in the other of the non-parallel four-link mechanisms for synchronously rotating the both links.

5. The vehicle seat device according to claim 1, wherein the center bending mechanism includes a combination of a bracket section arranged on one of the lower-side frame and the upper-side frame and forming a guide portion taking the shape of an arc with a center at the rotational center, and two or more slide sections arranged on the other of the lower-side frame and the upper-side frame and engaged with the guide portion of the bracket section to be movable in the circumferential direction of the arc but to be restricted from moving in the radial direction.

6. The vehicle seat device according to claim 5, wherein:

the combination of the bracket section and the slide sections in the center bending mechanism is arranged at each of the both end portions in the width direction of the seatback frame; and the drive means includes a rotation transmission shaft rotatably to extend between the both end portions of one of the lower-side frame and the upper-side frame, slide mechanisms for changing the relative positions between the bracket sections and the slide sections by the use of a rotational motion of the rotation transmission shaft, and rotation drive means for rotating the rotation transmission shaft.

7. The vehicle seat device according to claim 1, wherein the center bending mechanism is configured to tilt the upper-side frame about a rotational center that is ahead of a seatback outer layer covering a front surface of the seatback frame at all tilt positions of the upper-side frame.

8. A vehicle seat device comprising:

a seat cushion frame; and a seatback frame including a lower-side frame supported at a lower end portion thereof to be tiltable relative to a rear end portion of the seat cushion frame, an upper-side frame arranged at an upper portion of the lower-side frame, a center bending mechanism coupling the lower-side frame and the upper-side frame to be bendable forward, and drive means for driving the center bending mechanism;

wherein the center bending mechanism is configured to tilt the upper-side frame about a rotational center that is ahead of a seatback outer layer covering a front surface of the seatback frame, wherein the center bending mechanism is a non-parallel four-link mechanism including the lower-side frame and the upper-side frame as opposite links.

9. The vehicle seat device according to claim 8, wherein the center bending mechanism is configured to tilt the upper-side frame while moving the same in a direction extending from an upper end of the lower-side frame.

10. The vehicle seat device according to claim 8, wherein:

the non-parallel four-link mechanism of the center bending mechanism is arranged at each of both end portions in a width direction of the seatback frame; and the drive means includes link swing drive means for swinging one link of the links of the four-link mechanism, other than the lower-side frame and the upper-side frame in the non-parallel four-link mechanism arranged on one end side in the width direction of the seatback frame, relative to one frame of the lower-side frame and the upper-side frame on the one end side, and further comprising a rotation transmission shaft connecting either one of pivot points on the link swung by the link swing drive means with a corresponding pivot point on a link, corresponding to the link swung by the link swing drive means, in the other of the non-parallel four-link mechanisms for synchronously rotating the both links.

11. The vehicle seat device according to claim 8, wherein the center bending mechanism is configured to tilt the upper-side frame about a rotational center that is ahead of a seatback outer layer covering a front surface of the seatback frame at all tilt positions of the upper-side frame.

* * * * *